United States Patent [19]
Verdier

[11] 3,739,830
[45] June 19, 1973

[54] RIM SIDE RING FASTENING DEVICE

[75] Inventor: Henri Verdier, Beauregard-L-Eveque, France

[73] Assignee: Compagnie Generale Des Establissements Michelin, raison sociale Michelin & Cie, Clermont-Ferrand, France

[22] Filed: Feb. 3, 1972

[21] Appl. No.: 223,174

[30] Foreign Application Priority Data
Feb. 8, 1971  France .............................. 7104193

[52] U.S. Cl. ............... 152/398, 152/401, 152/409, 152/411, 301/103
[51] Int. Cl... B60b 25/12, B60b 25/14, B60c 19/00
[58] Field of Search .................. 152/151, 152, 155, 152/158, 161, 166, 306, 311, 330, 331, 339, 340, 372, 375, 376, 378, 379, 380, 381, 386, 387, 388, 389, 390, 391, 392, 393, 394, 395, 396, 397, 398, 399, 400, 401, 402, 403, 404, 405, 406, 407, 408, 409, 410, 411, 414; 301/38 R, 39 R, 39 ST, 96, 97, 103

[56] References Cited
UNITED STATES PATENTS

| | | |
|---|---|---|
| 815,346 | 3/1906 | Harris .................................. 152/401 |
| 1,105,524 | 7/1914 | Laurent .......................... 152/402 X |
| 1,112,568 | 10/1914 | Sessions.......................... 152/411 X |
| 1,276,917 | 8/1918 | Hofstatter.......................... 152/411 |
| 1,333,679 | 3/1920 | Rey................................. 152/411 X |
| 1,419,889 | 6/1922 | Nichols et al................... 152/411 X |
| 1,498,518 | 6/1924 | Darrow............................ 152/406 X |
| 1,609,099 | 11/1926 | Antilotti et al. ................. 152/411 X |
| 1,864,421 | 6/1932 | Ferrabino ......................... 152/411 |
| 2,868,262 | 1/1959 | Straussler........................ 152/401 |
| 3,003,538 | 10/1961 | Gerbeth............................ 152/405 |

*Primary Examiner*—Gerald M. Forlenza
*Assistant Examiner*—Howard Beltran
*Attorney*—Granville M. Brumbaugh, Eben M. Granes, Mark N. Donohue

[57] ABSTRACT

The rim of a wheel for road construction vehicles and the like comprises a conical ring and an associated side ring that bear against the bead of a tire mounted on the rim. The side ring has in axial cross section a curved portion, forming substantially a quarter circle, and two parallel straight portions, a first being an extension of one end of the curved portion and the second extending in a direction perpendicular to the other end of the curved portion and in the direction of the wheel axis. An adjustable fastening device permits adjustment of the conical and side rings with respect to each other.

2 Claims, 1 Drawing Figure

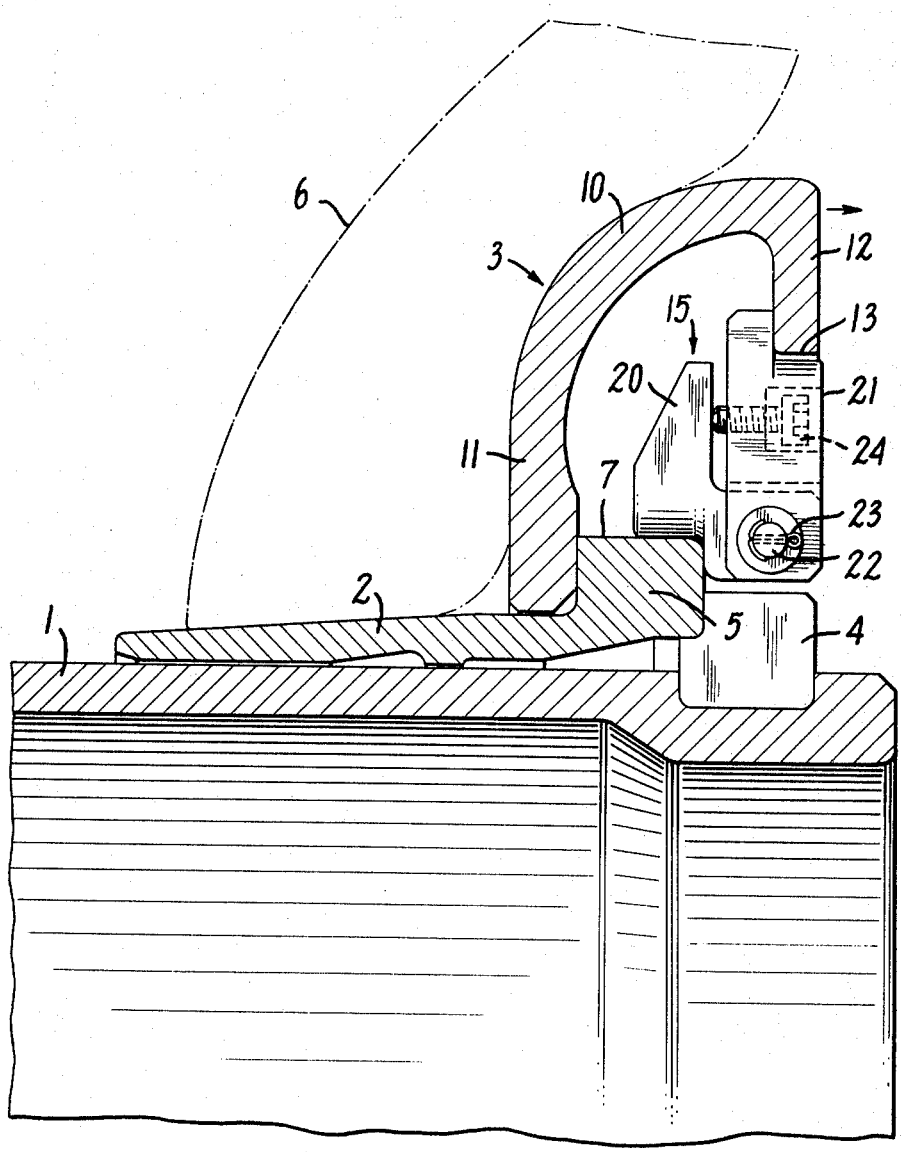

RIM SIDE RING FASTENING DEVICE

BACKGROUND OF THE INVENTION

This invention relates to wheels and, more particularly, to novel and highly-effective wheel elements serving for the mounting of giant pneumatic tires.

A conventional wheel for a giant pneumatic tire such as the tire of a road construction vehicle or the like comprises a rim well, conical rings serving as seats for the beads of the tire, side rings, and fixed and removable stops which assure the locking of the conical rings under the pressure exerted by the inflated tire. One of the conical rings may be an integral part of the rim well, but it is preferable that both conical rings be separate from the rim well. Furthermore, as has been proposed by the applicant, it is advantageous that the conical rings and the side rings be mounted permanently on the beads of the tire.

The customary shape of the side rings, whose cross section is substantially that of a quarter of a circle, has drawbacks.

A first drawback results from the insufficient rigidity of this quarter-circle cross section. The side ring on which the pressure of a bead of the tire acts does not offer sufficient resistance to pivoting around the zone between the base of the bead and the rim of the conical ring.

A second drawback comes from the absence of grip permitting the grasping of the side ring. This absence of grip prevents the provisional assembling of a side ring and a conical ring during the mounting of the bead. It also prevents the traction on the bead mounted on its conical ring which is often necessary to assure the proper mounting of the assembly on the rim well.

SUMMARY OF THE INVENTION

An object of the invention is to overcome the problems of the prior art wheels for road construction vehicles and the like outlined above. In particular, an object of the invention is to provide a side ring of improved construction and a fastening device which facilitates proper assembly of the side ring and an associated conical ring.

The foregoing and other objects are attained in accordance with the invention by the provision of a wheel comprising at least one conical ring and an associated side ring, the side ring being characterized by a cross section having a curved central portion, forming substantially a quarter circle, and two straight parallel portions, one forming an extension of the curved portion and the other forming a flange extending perpendicular to the end of the curved portion and in the direction of the axis of the wheel over a radial height less than that of the curved portion.

The addition of a flange to the side ring imparts to it a cross section the polar moment of inertia of which is greatly increased and the sensitivity to impacts of which is greatly decreased. This ring furthermore provides a grip making it possible to exert traction on the bead of the tire and also to effect an assembling of the side ring and the conical ring.

The device in accordance with the invention for fastening a side ring and a conical ring is characterized by two arms articulated around a pin, one of the outer faces of which abuts the radially outer face of the conical ring and the other of the outer faces of which abuts the inner face of the flange of the side ring, the distance between the two arms being adjusted by a screw threaded into one of the arms and bearing against the inner face of the other.

BRIEF DESCRIPTION OF THE DRAWING

An understanding of other aspects of the invention can be gained from a consideration of the following detailed description of the preferred embodiment thereof, in conjunction with the appended drawing, wherein the sole FIGURE is a fragmentary view in radial cross section of a wheel in accordance with the invention.

DESCRIPTION OF THE PREFERRED EMBODIMENT

The FIGURE shows a wheel rim well 1 on which there is arranged a conical ring 2 and a side ring 3. The conical ring 2 can slide to the left on the rim well 1 but is stopped on the right by a stop 4 abutting its shoulder 5. The position of the bead 6 of a tire is shown in dotted line.

In accordance with the invention, the side ring 3 comprises three portions: a central portion 10 forming a quarter circle, a straight portion 11 the end of which is inserted between the bead 6 and the shoulder 5 of the conical ring 2, and a straight portion 12 forming a flange. The flange 12 is parallel to the straight extension 11 and perpendicular to the adjacent end of the curved portion 10. This flange 12 makes it possible to exert traction on the conical ring 2 and the bead 6 in the direction indicated by the arrow.

The FIGURE also shows a fastening device 15 which makes it possible to hold the conical ring 2 and the side ring 3 against each other.

This fastening device 15 comprises two arms 20 and 21 pivoted around a pin 22 held by cotters 23. The arm 20 has a right-angle outer face that rests against the shoulder 5 of the conical ring 2. The arm 21 has a recess at its end enabling it to rest against the inner face of the flange 12. A screw 24 makes it possible to adjust the distance between the arms 20 and 21 and therefore to assure the holding in position of the side ring 3 with respect to the conical ring 2.

In order to facilitate the insertion of the arms 20 and 21 into the cavity defined by the conical ring 2 and the side ring 3, the portions of the arms 20 and 21 opposed to the radial face 7 of the rim 5 and the radial face 13 of the rim 12 can be curved so as to facilitate rotation of the fastening device 15 around an axis parallel to the axis of the wheel. The width of the fastening device 15 is for this purpose less than the free space between the radial faces 7 and 13.

Three fastening devices such as the fastening device 15 are sufficient to hold the conical ring 2 and the side ring 3 in position with respect to each other. This assembling favors the correct mounting of the bead 6 on its seat 2. When this mounting has been effected, the fastening devices 15 can be removed.

Thus there is provided in accordance with the invention novel, sturdy and highly-effective means whereby perfect coaxial positioning of the tire bead 6, conical ring 2, and side ring 3 is achieved, notwithstanding the considerable weight of the metal parts, which may reach or exceed 440.92 lbs. (200 kg). Many modifications of the representative embodiment disclosed herein will readily occur to those skilled in the art upon study of this disclosure. For example, the conical ring 2 and side ring 3 may or may not be permanently attached to the bead 6. Also, the illustrated structure may or may not be duplicated (as a mirror image) on the opposite side of the wheel. Accordingly, the invention is to be construed as including all the embodiments thereof within the scope of the appended claims.

I claim:

1. A wheel having an axis and comprising a rim, said rim comprising at least one conical ring mounted on the rim and an associated side ring, said side ring having in radial cross section extending from the axis a curved portion, forming substantially a quarter circle, and two parallel straight portions, a first of said straight portions being an extension of one end of said curved portion and the second of said straight portions extending in a direction perpendicular to the other end of said curved portion and towards the wheel axis, said second straight portion having a radial height less than that of said first straight portion.

2. A wheel according to claim 1 further comprising a fastening device facilitating proper positioning of said conical ring and said side ring with respect to each other, said fastening device comprising two arms, a pin mounting said arms pivotally with respect to each other, one of said arms bearing against said conical ring and the other of said arms bearing against said side ring, and adjustment means bearing on said arms for adjusting their relative positions with respect to each other, whereby the force with which they in turn respectively bear against said conical ring and said side ring can be adjusted to cause said conical ring and said side ring to be properly positioned with respect to each other.

* * * * *